(12) United States Patent
Takeyama et al.

(10) Patent No.: US 12,184,229 B2
(45) Date of Patent: Dec. 31, 2024

(54) SOLAR POWER GENERATION SYSTEM

(71) Applicant: OMRON Corporation, Kyoto (JP)

(72) Inventors: Takahiro Takeyama, Kyoto (JP); Ryo Ogura, Kyoto (JP); Jeongho Baik, Kyoto (JP); Jun Nakaichi, Kyoto (JP); Tsuyoshi Uchida, Hoffman Estates, IL (US); Tomoko Endo, Hoffman Estates, IL (US); Erica Martin, Hoffman Estates, IL (US)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/106,491

(22) Filed: Feb. 7, 2023

(65) Prior Publication Data

US 2023/0268875 A1 Aug. 24, 2023

(30) Foreign Application Priority Data

Feb. 22, 2022 (JP) .................................. 2022-026172

(51) Int. Cl.
*H02S 40/36* (2014.01)
*H02S 40/32* (2014.01)
*H02S 50/00* (2014.01)

(52) U.S. Cl.
CPC .............. *H02S 40/36* (2014.12); *H02S 40/32* (2014.12); *H02S 50/00* (2013.01)

(58) Field of Classification Search
CPC ........ H01L 31/00–078; H02S 40/30–38; H02J 2300/22–26
See application file for complete search history.

(56) References Cited

U.S. PATENT DOCUMENTS

| 2001/0023703 A1* | 9/2001 | Kondo | ..................... H02S 50/10 136/291 |
| 2009/0097172 A1* | 4/2009 | Bremicker | ............. H01H 9/542 361/13 |

(Continued)

FOREIGN PATENT DOCUMENTS

| JP | 2012-511299 A | 5/2012 |
| JP | 2016135016 A | * 7/2016 |

(Continued)

OTHER PUBLICATIONS

JP-2016135016-A English (Year: 2016).*

*Primary Examiner* — Bach T Dinh
(74) *Attorney, Agent, or Firm* — SHINJYU GLOBAL IP

(57) ABSTRACT

A solar power generation system includes a string, an inverter, a first shutoff device, and a second shutoff device'. The string includes a plurality of solar cell modules connected in series. The first shutoff device cuts off the string and the inverter in response to a first control signal from the inverter. The second shutoff device cuts off a solar cell module group including one or more among the plurality of solar cell modules and either another solar cell module or the inverter in response to a second control signal from the first shutoff device. The second shutoff device includes a first switching unit that includes a first open and close unit and a first semiconductor switching device connected in parallel with the first open and close unit. The first semiconductor switching device is turned ON before the first open and close unit is operated.

14 Claims, 11 Drawing Sheets

(56) References Cited

U.S. PATENT DOCUMENTS

| | | | |
|---|---|---|---|
| 2016/0190798 A1* | 6/2016 | Narla | H02H 7/122 |
| | | | 307/80 |
| 2017/0271875 A1* | 9/2017 | Narla | H02S 40/32 |
| 2021/0281065 A1* | 9/2021 | Zhu | H02S 40/32 |
| 2022/0255500 A1* | 8/2022 | Ogura | H02S 40/30 |

FOREIGN PATENT DOCUMENTS

| | | | | |
|---|---|---|---|---|
| WO | 2010/065043 A1 | 6/2010 | | |
| WO | WO-2021024339 A1 * | 2/2021 | | H02S 40/32 |

* cited by examiner

| OPERATION MODE | | WEATHER SUNLIGHT | POWER GENERATION | FIRST CONTROL SIGNAL | RELAY OPERATION MODE |
|---|---|---|---|---|---|
| START | | ☀ | YES | NONE | ON |
| ACTIVE | | ☀ | YES | NONE | ON |
| SAFETY | | ☽☁ | NO | PRESENT | OFF |
| | NORMAL SHUTOFF | ⛅ | UNSTABLE | NONE | ON |
| | EMERGENCY SAFETY SHUTOFF | ☀ | YES | PRESENT | OFF |

FIG. 8

| OPERATION MODE | | WEATHER SUNLIGHT | POWER GENERATION | SECOND CONTROL SIGNAL | RELAY OPERATION MODE |
|---|---|---|---|---|---|
| START | | ☀ | YES | NONE | ON |
| ACTIVE | | ☀ | YES | NONE | ON |
| SAFETY | NORMAL SHUTOFF | ☾☁ | NO | PRESENT | OFF |
| | | ⛅ | UNSTABLE | NONE | ON/OFF |
| EMERGENCY SAFETY SHUTOFF | | ☀ | YES | PRESENT | OFF |

FIG. 9

SOLAR POWER GENERATION SYSTEM

CROSS-REFERENCES TO RELATED APPLICATIONS

This application claims priority under 35 U.S.C. § 119 to Japanese Patent Application No. 2022-026172 filed on Feb. 22, 2022. The entire disclosure of Japanese Patent Application No. 2022-026172 is hereby incorporated herein by reference.

FIELD

The present invention relates to a solar power generation system.

BACKGROUND

Some solar power generation systems are equipped with a function configured to immediately stop the power generation in an emergency, for the purpose of protecting firefighters from electric shock in an emergency such as a fire (for example, see Published Japanese Translation No. 2012-511299 of the PCT International Publication). The function is called rapid shutdown function, which is executed by a shutoff device configured to cut off the electric path of the solar power generation system in response to a control signal generated in an emergency.

SUMMARY

A solar power generation system includes a shutoff device, and the shutoff device uses a switching device configured to open and close a mechanical contact such as a relay, as a switching device for cutting off an electric path in the solar power generation system. The switching device generates noise including surge when opening and closing the contact The switching device is often driven by the power supplied from the solar cell modules of the solar power generation system. In this case, when the amount of power generated by the solar cell modules is smaller than that required for driving the switching device, for example, even if an attempt is made to close the contact of the switching device with the power from the solar cell modules (even if an attempt is made to turn the switching device into an ON state), the contact may be opened immediately (the switching device is turned into an OFF state), and the closing and opening may be repeated. Further, when the amount of power generated by the solar cell modules becomes unstable, the switching device may be repeatedly switched between the ON state and the OFF state. These phenomena destabilize the operation of the solar power generation system.

An object of the present invention is to improve the stability of a solar power generation system.

A solar power generation system according to one aspect of the present invention includes a string, an inverter, a first shutoff device, and a second shutoff device. The string includes a plurality of solar cell modules connected in series. The inverter is connected to the string and configured to convert DC power output from the solar cell modules to AC power. The first shutoff device is connected between the string and the inverter and configured to cut off the string and the inverter in response to a first control signal from the inverter. The second shutoff device is connected to an electric path connecting a solar cell module group and either another solar cell module or the inverter. The solar cell module group includes one or more among the plurality of solar cell modules connected in series in the string. The second shutoff device is configured to cut off the solar cell module group and either the another solar cell module or the inverter in response to a second control signal output from the first shutoff device.

The second cut-off device is driven by power generated by the one or more among the plurality of solar cell modules connected in series in the solar cell module group. The second shutoff device includes a first switching unit connected to an electric path connecting an anode side terminal of the solar cell module group and either the another solar cell module or the inverter. The first switching unit includes a first open and close unit and a first semiconductor switching device connected in parallel with the first open and close unit. The first semiconductor switching device is turned ON before the first open and close unit is operated.

In the solar power generation system, the second shutoff device driven by the power from the solar cell module group includes a first switching unit, and the first switching unit includes a first open and close unit and a first semiconductor switching device connected in parallel with the first open and close unit. The first semiconductor switching device is turned ON before the first open and close unit is operated. In the second shutoff device driven by the power from the solar cell module group, turning the first semiconductor switching device ON before the first open and close unit is operated reduces the occurrence of a phenomenon in which, when the amount of power generated by the solar cell module group is smaller than the power for driving the first open and close unit and/or the amount of power generated by the solar cell module group is unstable, the first open and close unit opens and closes according to the amount of power from the solar cell module group, and the connection and cutoff of the electric path to which the anode side terminal of the solar cell module group is connected is repeated. As a result, the operation of the solar power generation system is stabilized.

The first switching unit may include a second open and close unit connected in series with the first semiconductor switching device. In this case, the first semiconductor switching device can be reliably electrically cut off from the solar power generation system.

The second shutoff device may include a second switching unit connected to an electric path connecting a cathode side terminal of the solar cell module group and either the another solar cell module or the inverter. The second switching unit may include a third open and close unit and a second semiconductor switching device connected in parallel with the third open and close unit. The second semiconductor switching device may be turned ON before the third open and close unit is operated. In this case, in the second shutoff device, both the electric path connecting the anode side terminal of the solar cell module group and other device, and the electric path connecting the cathode side terminal of the solar cell module group and the other device can be cut off. In addition, it is possible to reduce the occurrence of the phenomenon in which, when the amount of power generated by the solar cell module group is smaller than the drive power of the third open and close unit and/or when the amount of power generated by the solar cell module group is unstable, the third open and close unit is operated to open and close according to the amount of power generated by the solar cell module group, and connection and cutoff of the electric paths to which the cathode side terminal of the solar cell module group are connected is repeated. As a result, the operation of the solar power generation system is stabilized.

The second switching unit may include an fourth open and close unit connected in series with the second semiconductor switching device. In this case, the second semiconductor switching device can be reliably electrically cut off from the solar power generation system.

The first switching unit and the second switching unit may be turned ON/OFF simultaneously. In this case, in response to the second control signal, both the electric path connecting the anode side terminal of the solar cell module group and the other device and the electric path connecting the cathode side terminal of the solar cell module group and the other device can be cut off simultaneously.

The first switching unit and the second switching unit may be turned ON/OFF independently of each other. In this case, the types of cutoff combinations can be increased, in response to the second control signal, using the electric path connecting the anode side terminal of the solar cell module group and the other device and the electric path connecting the cathode side terminal of the solar cell module group and the other device.

The first shutoff device may include a third switching unit connected to an anode side terminal of the string and an anode side terminal of the inverter. The third switching unit may include a fifth open and close unit and a third semiconductor switching device connected in parallel with the fifth open and close unit. The third semiconductor switching device may be turned ON state before the fifth open and close unit is operated. In this case, generation of noise and chattering is reduced in the third switching unit connected to the anode side terminal of the string and the anode side terminal of the inverter, and the operation of the solar power generation system is stabilized.

The third switching unit may include a sixth open and close unit connected in series with the third semiconductor switching device. In this case, the third semiconductor switching device can be reliably electrically cut off from the solar power generation system.

The first shutoff device may include a fourth switching unit connected to a cathode side terminal of the string and a cathode side terminal of the inverter. The fourth switching unit may include a seventh open and close unit and a fourth semiconductor switching device connected in parallel with the seventh open and close unit. The fourth semiconductor switching device may be turned ON before the seventh open and close unit is operated. In this case, generation of noise and chattering is reduced in the fourth switching unit connected to the cathode side terminal of the string and the cathode side terminal of the inverter, and the operation of the solar power generation system is stabilized.

The fourth switching unit may include a eighth open and close unit connected in series with the fourth semiconductor switching device. In this case, the fourth semiconductor switching device can be reliably electrically cut off from the solar power generation system.

The third switching unit and the fourth switching unit may be turned ON/OFF simultaneously. In this case, in response to the first control signal, the electric path connecting the anode side terminal of the string and the anode side terminal of the inverter and the electric path connecting the cathode side terminal of the string and the cathode side terminal of the inverter can be cut off simultaneously.

The third switching unit and the fourth switching unit may be turned ON/OFF independently of each other. In this case, the types of cutoff combinations can be increased using the electric path connecting the anode side terminal of the string and the anode side terminal of the inverter and the electric path connecting the cathode side terminal of the string and the cathode side terminal of the inverter.

The second shutoff device may include a bypass device connected in parallel with the solar cell module group and configured to form an electric path bypassing the solar cell module group.

In this case, when an abnormality occurs in the solar cell module group, the power generated by the other solar cell module is able to bypass the bypass device to be supplied to the inverter.

The first shutoff device may be driven by power supplied from a commercial power supply. In this case, the first shutoff device can operate whether or not power is supplied thereto from the string. As a result, the string and the inverter can be reliably cut off in an emergency, and thereby the safety of the solar power generation system in an emergency can be improved.

The inverter may output the first control signal to the first shutoff device by power line communication. In this case, no separate wiring for communication between the inverter and the first shutoff device is necessary.

The inverter may output the first control signal to the first shutoff device by wireless communication. In this case, no wiring for communication between the inverter and the first shutoff device is necessary.

The first shutoff device may output the second control signal to the second shutoff device by power line communication, upon receipt of the first control signal from the inverter. In this case, no separate wiring for communication between the first shutoff device and the second shutoff device is necessary.

The first shutoff device may output the second control signal to the second shutoff device by wireless communication, upon receipt of the first control signal from the inverter. In this case, no wiring for communication between the first shutoff device and the second shutoff device is necessary.

According to the present invention, it is possible to improve the stability of a solar power generation system.

BRIEF DESCRIPTION OF THE DRAWINGS

FIG. 8 is a diagram showing a state of a first shutoff device in each operation mode.

FIG. 9 is a diagram showing a state of a second shutoff device in each operation mode.

DETAILED DESCRIPTION

Figure 1:
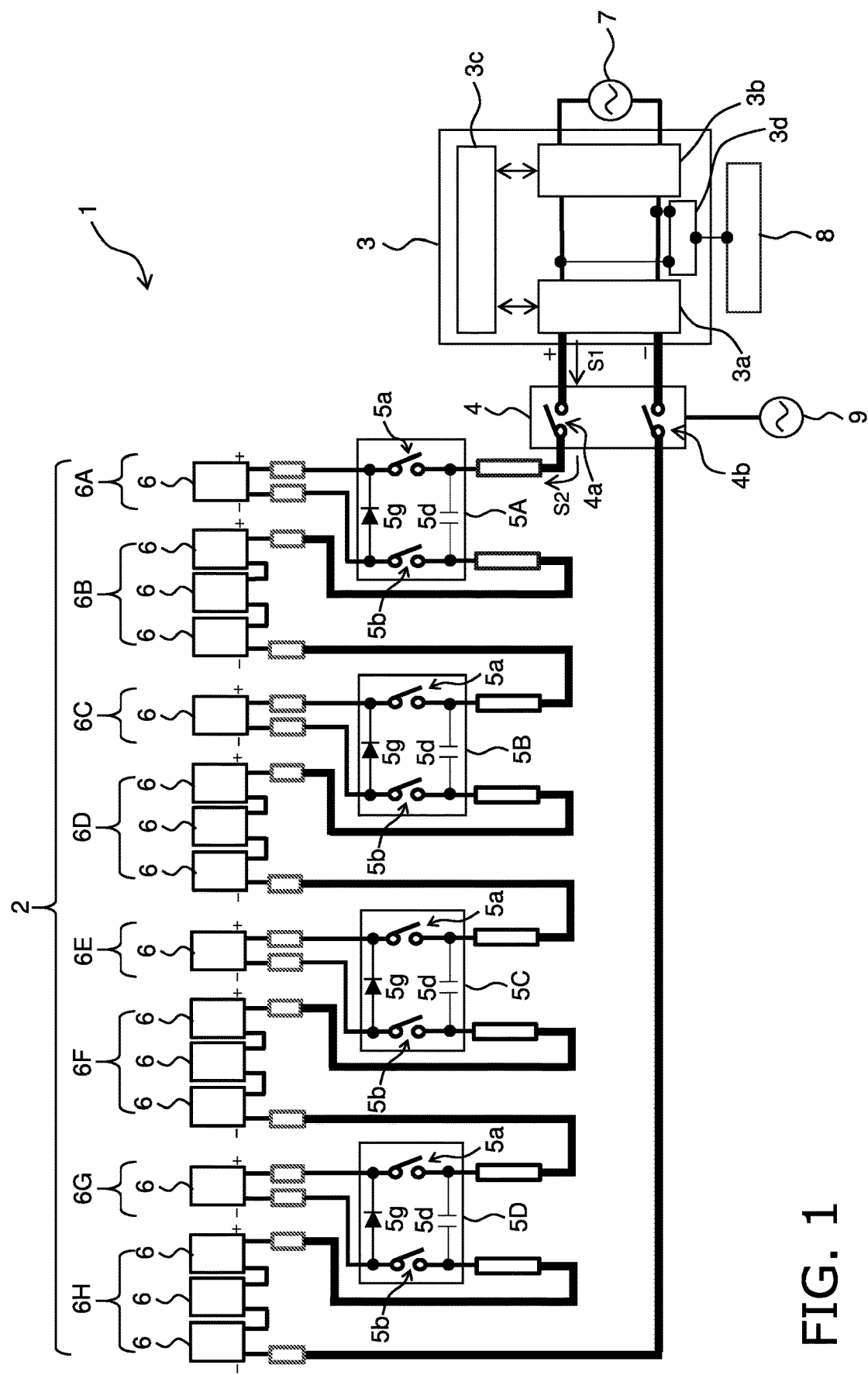
FIG. 1 is a diagram showing a configuration of a solar power generation system.

A solar power generation system 1 is described with reference to FIG. 1. FIG. 1 is a diagram showing a configuration of the solar power generation system 1. The solar power generation system 1 includes a string 2, an inverter 3, a first shutoff device 4, and second shutoff devices 5A to 5D.

The string 2 includes a plurality of solar cell modules 6 connected in series. The string 2 of the present embodiment includes 16 solar cell modules 6. It should be noted that the solar power generation system 1 may include a solar cell array in which a plurality of strings 2 are connected in parallel.

The string 2 includes a plurality of solar cell module groups. Each of the plurality of solar cell module groups includes one or a plurality of solar cell modules 6 connected in series. Each solar cell module group has an anode side terminal and a cathode side terminal. In a group including one solar cell module 6, the anode of the solar cell module 6 provides the anode side terminal of said group, and the cathode of the solar cell module 6 provides the cathode side terminal of said group.

In a group including a plurality of solar cell modules 6, among the plurality of the solar cell modules 6 connected in series, the anode side terminal of said group is the anode of the solar cell module 6 closest to the anode of the inverter 3, and the cathode side terminal of this group is the cathode of the solar cell module 6 closest to the cathode of the inverter 3. In FIG. 1, the anode side terminal of each solar cell module group is indicated by "+", and the cathode side terminal is indicated by "−".

The string 2 includes eight solar cell module groups in total: a first solar cell module group 6A to an eighth solar cell module group 6H. The first group 6A, the third group 6C, the fifth group 6E, and the seventh group 6G each include one solar cell module 6. The second group 6B, the fourth group 6D, the sixth group 6F, and the eighth group 6H each include three solar cell modules 6.

The first group 6A to the eighth group 6H are connected in series in the string 2. Specifically, the cathode side terminal of the first group 6A is connected to the anode side terminal of the second group 6B. The cathode side terminal of the second group 6B is connected to the anode side terminal of the third group 6C. The cathode side terminal of the third group 6C is connected to the anode side terminal of the fourth group 6D. The cathode side terminal of the fourth group 6D is connected to the anode side terminal of the fifth group 6E. The cathode side terminal of the fifth group 6E is connected to the anode side terminal of the sixth group 6F. The cathode side terminal of the sixth group 6F is connected to the anode side terminal of the seventh group 6G The cathode side terminal of the seventh group 6G is connected to the anode side terminal of the eighth group 6H. It should be noted that the anode side terminal of the first group 6A is connected to the anode side terminal of the inverter 3. The cathode side terminal of the eighth group 6H is connected to the cathode side terminal of the inverter 3.

The solar cell modules 6 receive sunlight and generate power. The solar cell modules 6 have an open circuit voltage of 50 V, for example. The inverter 3 is connected to the string 2 via a power line. The inverter 3 converts DC power output from the string 2 in which the plurality of solar cell modules 6 are connected in series into AC power. The inverter 3 is connected to a power system 7 and supplies the AC power to commercial power systems and load devices.

Specifically, the inverter 3 includes a DC/DC converter 3a, a DC/AC inverter 3b, a control unit 3c, and a first control signal generating unit 3d. The DC/DC converter 3a converts the voltage of the power output from the string 2 into a predetermined voltage and inputs it to the DC/AC inverter 3b. The DC/AC inverter 3b converts the DC power output from the DC/DC converter 3a into AC power.

The control unit 3c is a computer system including a CPU, memory, and various interface. The control unit 3c controls the DC/DC converter 3a and the DC/AC inverter 3b. The control unit 3c may control the DC/DC converter 3a and the DC/AC inverter 3b by executing a program stored in a storage device. The first control signal generating unit 3d outputs a first control signal S1 to the first shutoff device 4 by power line communication when an operation switch 8 is pressed.

The first shutoff device 4 is connected to a power line connecting between the string 2 and the inverter 3. The first shutoff device 4 cuts off the string 2 and the inverter 3 in response to the first control signal S1 from the inverter 3.

The second shutoff devices 5A to 5D are each connected to an electric path connecting one solar cell module group and other solar cell module or an electric path connecting one solar cell module group and the inverter 3.

Specifically, the second shutoff device 5A is connected to an electric path connecting the anode side terminal of the first group 6A and the first shutoff device 4, and also to an electric path connecting the cathode side terminal of the first group 6A and the anode side terminal of the second group 6B. The second shutoff device 5B is connected to an electric path connecting the anode side terminals of the third group 6C and the cathode side terminals of the second group 6B, and also to an electric path connecting the cathode side terminals of the third group 6C and the anode side terminal of the fourth group 6D. The second shutoff device 5C is connected to an electric path connecting the anode side terminals of the fifth group 6E and the cathode side terminals of the fourth group 6D, and also to an electric path connecting the cathode side terminals of the fifth group 6E and the anode side terminal of the sixth group 6F. The second shutoff device 5D is connected to an electric path connecting the anode side terminals of the seventh group 6G and the cathode side terminals of the sixth group 6F, and also to an electric path connecting the cathode side terminals of the seventh group 6G and the anode side terminal of the eighth group 6H.

In response to the second control signal S2 from the first shutoff device 4, each of the second shutoff devices 5A to 5D cuts off, the solar cell module group to which the device itself is connected and the other solar cell modules, or cuts off the solar cell module group to which the device itself is connected and the inverter 3.

Figure 2:
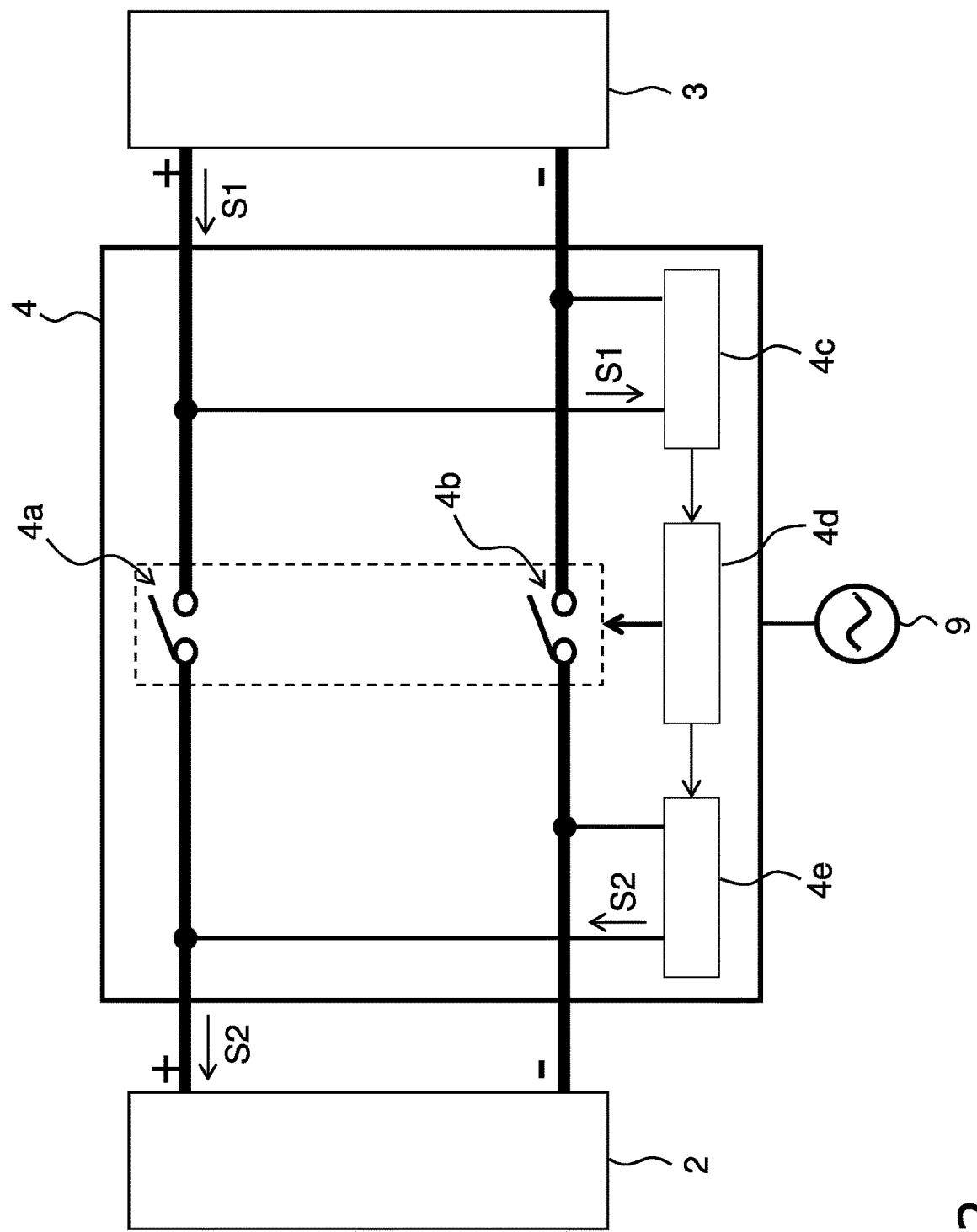
FIG. 2 is a diagram showing a configuration of a first shutoff device.

A configuration of the first shutoff device 4 will be described below with reference to FIG. 2. FIG. 2 is a diagram showing a configuration of the first shutoff device 4. The first shutoff device 4 includes a first switching unit 4a, a second switching unit 4b, a first signal receiving unit 4c, a first driving unit 4d, and a first signal sending unit 4e.

The first switching unit 4a has one end connected to the anode side terminal of the string 2 and the other end connected to the anode side terminal of the inverter. The anode side terminal of the string 2 corresponds to the anode of the solar cell module 6 in the first group 6A. The first switching unit 4a connects or cut off the electric path between the anode side terminal of the string 2 and the anode side terminal of the inverter 3.

The second switching unit 4b has one end connected to the cathode side terminal of the string 2 and the other end connected to the cathode side terminal of the inverter. The cathode side terminal of the string 2 corresponds to the cathode of the solar cell module 6, among the solar cell modules 6 in the eighth group 6H, closest to the cathode side terminal of the inverter 3. The second switching unit 4b connects or cut off the electric path between the cathode side terminal of the string 2 and the cathode side terminal of the inverter 3.

In the present embodiment, the first switching unit 4a and the second switching unit 4b are simultaneously switched between the ON state and the OFF state under the control of the first driving unit 4d. As a result, it is possible to simultaneously cut off the power line connecting the anode side terminal of the string 2 and the anode side terminal of the inverter 3 and the power line connecting the cathode side terminal of the string 2 and the cathode side terminal of the inverter 3.

It should be noted that "turn the switching unit ON" means that the switching unit is made conductive to enable the power line or the electric path to which the switching unit is connected to be electrically conductive. In contrast, "turn the switching unit OFF" means that the switching unit is made insulated to electrically cut off the power line or electric path to which the switching unit is connected.

In addition, the first switching unit 4a and the second switching unit 4b may be independently supplied with the drive signal from the first driving unit 4d to be switched between the ON state and the OFF state independently of each other. Accordingly, the types of cutoff combinations can be increased using the power line connecting the anode side terminal of the string 2 and the anode side terminal of the inverter 3 and the power line connecting the cathode side terminal of the string 2 and the cathode side terminal of the inverter 3. For example, both of the above two power lines can be cut off, and one of the two power lines can be cut off as well. As a result, even if one of the switching units does not operate properly, the string 2 and the inverter 3 can be reliably cut off by cutting off one power line by another switching unit.

The first signal receiving unit 4c receives a first control signal S1 output from the inverter 3. Upon receiving the first control signal S1, the first signal receiving unit 4c outputs, to the first driving unit 4d, a signal indicating that the first control signal S1 has been received. In the present embodiment, the first control signal S1 is output by power line communication to the power line connecting the inverter 3 and the first shutoff device 4. Thus, the first signal receiving unit 4c is, for example, a signal receiving circuit configured to extract a signal sent by power line communication from the power line.

The first driving unit 4d outputs a drive signal for driving the first switching unit 4a and the second switching unit 4b, to the first switching unit 4a and the second switching unit 4b. When the string 2 is connected to the inverter 3, the first driving unit 4d outputs a drive signal for turning ON the first switching unit 4a and the second switching unit 4b, to the first switching unit 4a and the second switching unit 4b. In contrast, upon receiving a signal indicating that the first control signal S1 has been received from the first signal receiving unit 4c, the first driving unit 4d stops outputting the drive signal, and turns OFF the first switching unit 4a and the second switching unit 4b. With the configuration, the first switching unit 4a and the second switching unit 4b are able to cut off the string 2 and the inverter 3 in response to the first control signal S1.

On the contrary to the above configuration, the first switching unit 4a and the second switching unit 4b may be turned OFF upon receipt of the drive signal from the first driving unit 4d. In this case, the first driving unit 4d outputs a drive signal when receiving from the first signal receiving unit 4c a signal indicating that the first control signal S1 has been received, and turns OFF the first switching unit 4a and the second switching unit 4b. When not receiving the signal indicating that the first control signal S1 has been received, the first driving unit 4d stops outputting the drive signal, and turns ON the first switching unit 4a and the second switching unit 4b.

The first driving unit 4d is, for example, a signal generating circuit configured to generate a signal for driving the first switching unit 4a and the second switching unit 4b upon receipt of a signal from the first signal receiving unit 4c.

When cutting off the string 2 and the inverter 3 in response to the first control signal S1, the first driving unit 4d outputs, to the first signal sending unit 4e, a signal indicating that the string 2 and the inverter 3 have been cut off. The first signal sending unit 4e, when receiving the signal indicating that the string 2 and the inverter 3 have been cut off, outputs a second control signal S2 to the power line connecting the first shutoff device 4 and the string 2. In the present embodiment, the first signal sending unit 4e outputs the second control signal S2 to the power line connecting the first shutoff device 4 and the string 2 by power line communication. Thus, the first signal sending unit 4e is, for example, a signal generating circuit configured to generate and output a signal to be sent by power line communication.

The first shutoff device 4 is driven by an external commercial power supply 9. Specifically, the first driving unit 4d uses AC power supplied from the commercial power supply 9 to generate a signal for driving the first switching unit 4a and the second switching unit 4b. For example, the first driving unit 4d converts the AC power from the commercial power supply 9 into DC power to generate drive power. The first signal receiving unit 4c and the first signal sending unit 4e are also driven by the AC power supplied from the commercial power supply 9. These configurations allow the first shutoff device 4 to operate regardless of whether power is supplied from the string 2 or not.

Figure 3:
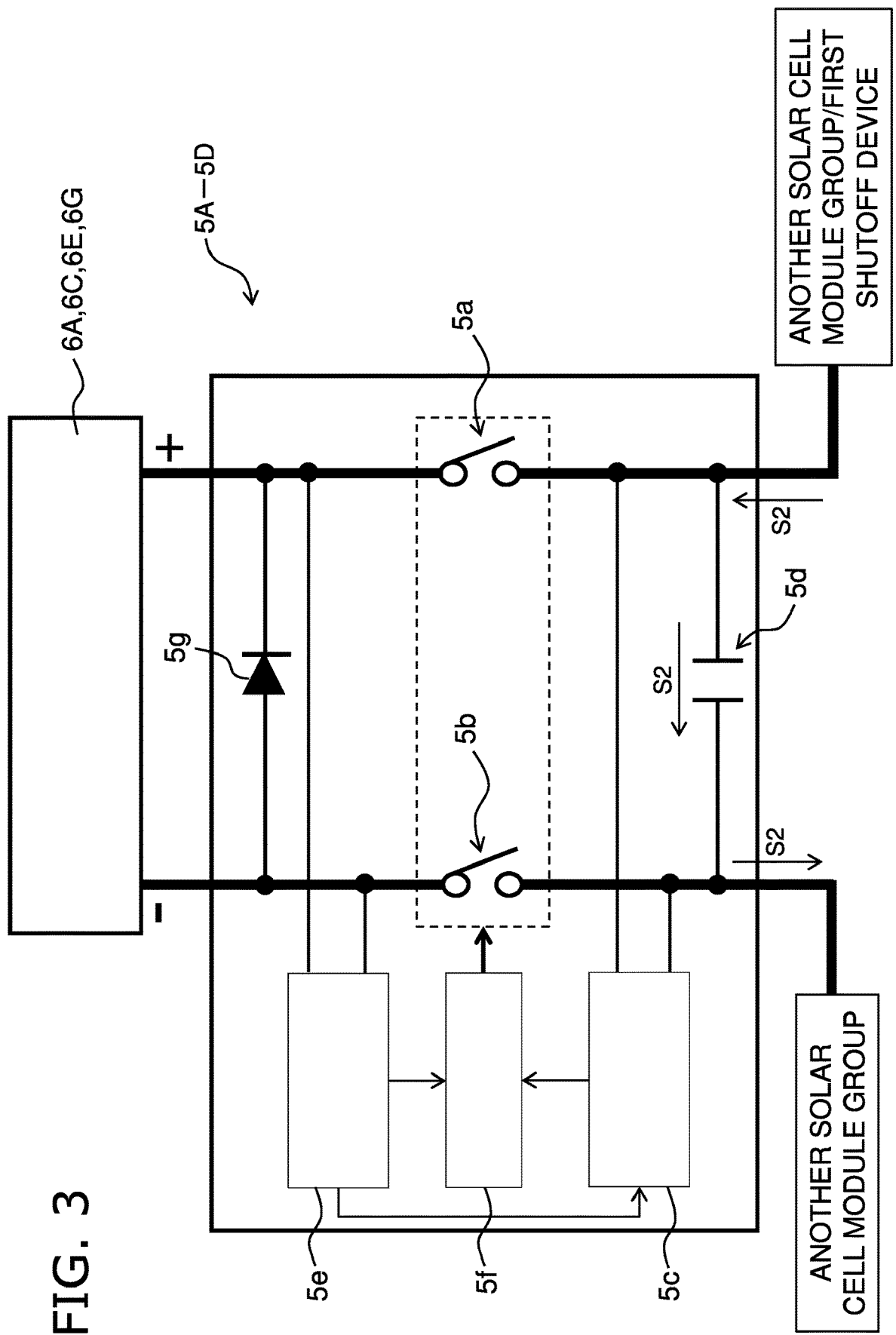
FIG. 3 is a diagram showing a configuration of a second shutoff device.

A configuration of the second shutoff devices 5A to 5D will be described below with reference to FIG. 3. FIG. 3 is a diagram showing a configuration of the second shutoff devices 5A to 5D. The second shutoff devices 5A to 5D have an identical configuration. Thus, the configuration of the second shutoff device 5A will be described in the following as an example. The second shutoff device 5A includes a third switching unit 5a, a fourth switching unit 5b, a second signal receiving unit 5c, a bypass circuit 5d, a power supply unit 5e, a second driving unit 5f, and a bypass device 5g.

The third switching unit 5a has one end connected to the anode side terminal of the first group 6A and the other end connected to the first shutoff device 4. The third switching unit 5a connects or cut off the electric path between the anode side terminal of the first group 6A and the first shutoff device 4. The fourth switching unit 5b has one end connected to the cathode side terminal of the first group 6A and the other end connected to the anode side terminal of the second group 6B. The fourth switching unit 5b connects or cut off the electric path between the cathode side terminal of the first group 6A and the anode side terminal of the second group 6B.

In the present embodiment, the third switching unit 5a and the fourth switching unit 5b are simultaneously switched between the ON state and the OFF state under the control of the second driving unit 5f. With the configuration, the second shutoff device 5A is able to simultaneously cut off the electric path connecting the anode side terminal of the first group 6A and the first shutoff device 4 and the electric path connecting the cathode side terminal of the first group 6A and the anode side terminal of the second group 6B.

In addition, the third switching unit 5a and the fourth switching unit 5b may be independently supplied with the drive signal from the second driving unit 5f to be switched between the ON state and the OFF state independently of each other. With the configuration, the second shutoff device 5A is able to increase the types of cutoff combinations using the electric path connecting the anode side terminal of the first group 6A and the first shutoff device 4 and the electric path connecting the cathode side terminal of the first group 6A and the anode side terminal of the second group 6B. For example, both the above two electric paths can be cut off, and only one of the two electric paths can be cut off as well. As a result, even if one of the switching units does not operate properly, the first group 6A and other device can be cut off by cutting off one electric circuit by another switching unit.

The second signal receiving unit 5c receives the second control signal S2 output from the first shutoff device 4. The second signal receiving unit 5c, when receiving the second control signal S2, outputs to the second driving unit 5f a signal indicating that the second control signal S2 has been received. In the present embodiment, the second control signal S2 is output, by power line communication, to the electric path connecting the first shutoff device 4 and the second shutoff device 5A. Thus, the second signal receiving unit 5c is, for example, a signal receiving circuit configured to extract a signal sent by power line communication from an electric circuit.

The bypass circuit 5d is a circuit that is configured to transmit the second control signal S2 sent via one electric path to the other electric path in the second shutoff device 5A. Specifically, the bypass circuit 5d transmits the second control signal S2 sent via the electric path, to which the first shutoff device 4 is connected, to the electric path connecting the cathode side terminal of the first group 6A and the anode side terminal of the second group 6B.

In the present embodiment, the second control signal S2 is transmitted through the electric paths by power line communication. That is, the second control signal S2 is a signal of a predetermined frequency. Accordingly, the bypass circuit 5d is a circuit configured to pass signals of a predetermined frequency. Specifically, the bypass circuit 5d is, for example, a high-pass filter circuit configured to pass signals of frequencies equal to or higher than the predetermined frequency, or a band-pass filter circuit that is configured to pass only signals of the predetermined frequency. The bypass circuit 5d, which is a high-pass filter, can be implemented by a capacitor device, for example.

The power supply unit 5e uses the power generated by the solar cell module included in the first group 6A to generate power to drive the second shutoff device 5A. When DC power is used as power for driving the second shutoff device 5A, the power supply unit 5e is, for example, a regulator circuit.

The second driving unit 5f outputs a drive signal for driving the third switching unit 5a and the fourth switching unit 5b, to the third switching unit 5a and the fourth switching unit 5b. The second driving unit 5f uses the power supplied from the power supply unit 5e to generate the drive signal and outputs it to the third switching unit 5a and the fourth switching unit 5b.

When it is desired to connect the solar cell module groups to which the second shutoff device 5A is connected to another device, the second driving unit 5f outputs a drive signal to the third switching unit 5a and the fourth switching unit 5b to turn ON the third switching unit 5a and the fourth switching unit 5b.

In contrast, upon receipt of a signal indicating that the second control signal S2 has been received from the second signal receiving unit 5c, the second driving unit 5f stops outputting the drive signal and turns OFF the third switching unit 5a and the fourth switching unit 5b. Thus, the third switching unit 5a and the fourth switching unit 5b are able to cut off the solar cell module groups and other device in response to the second control signal S2.

On the contrary to the above configuration, the third switching unit 5a and the fourth switching unit 5b may be turned OFF upon receipt of a drive signal from the second driving unit 5f. In this case, the second driving unit 5f outputs a drive signal when receiving a signal indicating that the second control signal S2 has been received from the second signal receiving unit 5c, and turns OFF the third switching unit 5a and the fourth switching unit 5b. When not receiving the signal indicating that the second control signal S2 has been received, the second driving unit 5f stops outputting the drive signal and turns ON the third switching unit 5a and the fourth switching unit 5b.

The second driving unit 5f is, for example, a signal generating circuit configured to, when receiving a signal from the second signal receiving unit 5c, generate a signal driving for the third switching unit 5a and the fourth switching unit 5b, using the power supplied from the power supply unit 5e.

The second control signal S2 is output, after the first shutoff device 4 receives the first control signal S1 and cuts off the string 2 and the inverter 3. Accordingly, the electric paths are cut off by the second shutoff device 5A after the string 2 and the inverter 3 are cut off.

The bypass device 5g is connected in parallel with the first group 6A to which the second shutoff device 5A is connected. The bypass device 5g forms an electric path bypassing the solar cell module groups to which the second shutoff device 5A is connected. As shown in FIG. 3, the bypass device 5g is a diode having an anode connected to the cathode side terminal of the first group 6A and a cathode connected to the anode side terminal of the first group 6A.

When an abnormality such as a sudden power drop or unusual heat generation occurs at the first group 6A to which the second shutoff device 5A is connected and the first group 6A cannot output sufficient power, the bypass device 5g forms an electric path that "bypasses" the defective first group 6A so as to transfer the power generated by the other solar cell module groups. Specifically, when an abnormality occurs in the first group 6A, the bypass device 5g of the second shutoff device 5A forms a path to transfer the power, which is generated by the second group 6B to the eighth group 6H, from the second group 6B to the inverter 3 (the first shutoff device 4).

When the first group 6A becomes unable to output sufficient power, the bypass device 5g, which is a diode, is able to instantly form an electric path that bypasses the defective first group 6A based on its electrical characteristics without an external signal command.

Figure 4:
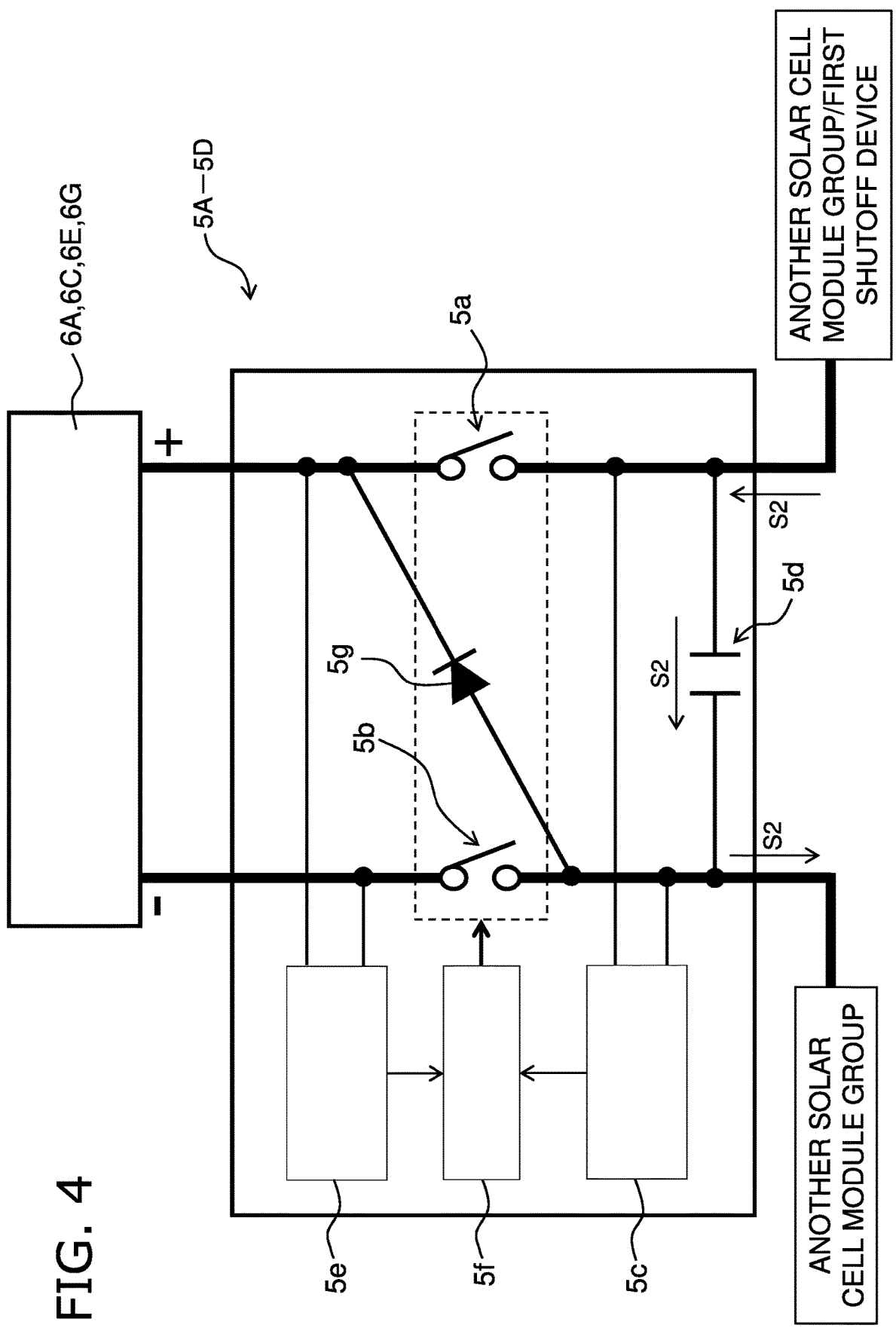
FIG. 4 is a diagram showing another example of connection of a bypass device in a second shutoff device.

It should be noted that the two terminals of the bypass device 5g can be connected to any point as desired as long as the first group 6A to which the second shutoff device 5A is connected is bypassed and also at least one of the terminals of the bypass device 5g is connected to the first group 6A without connection to the third switching unit 5a or the fourth switching unit 5b. For example, as shown in FIG. 4, a configuration is possible in which the anode of the diode bypass device 5g is connected to the electric path connecting the anode side terminal of the second group 6B and the fourth switching unit 5b and the cathode of the diode bypass device 5g is connected to the electric path connecting the anode side of the first group and the third switching unit 5a. FIG. 4 is a diagram showing another example of connection of the bypass device 5g in the second shutoff device 5A.

Figure 5:
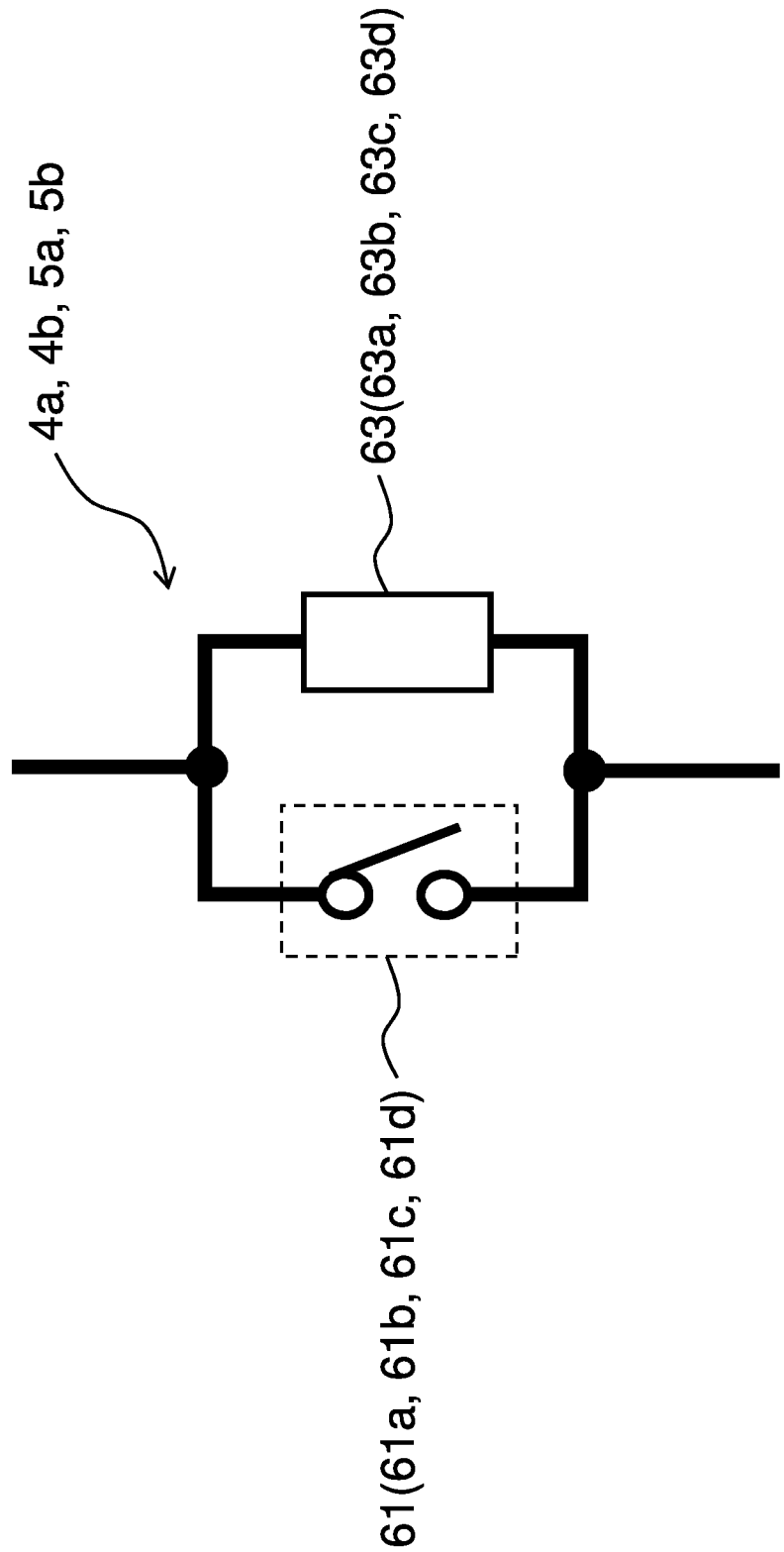
FIG. 5 is a diagram showing a configuration of a switching unit.

Now, configurations of the first switching unit 4a, the second switching unit 4b, the third switching unit 5a, and the fourth switching unit 5b will be described below with reference to FIG. 5. FIG. is a diagram showing a configuration of a switching unit. The above switching units include an open and close unit 61 and a semiconductor switching device 63.

The open and close unit 61 is, for example, a switching device that is configured to connect and cut off the electric path connected to the open and close unit 61 by opening and closing a contact. The open and close unit 61 is, for example, a relay. The open and close unit 61 (the first open and close unit 61a) of the first switching unit 4a has one end connected to the anode side terminal of the string 2 and the other end connected to the anode side terminal of the inverter 3, and is driven to open and close by the first driving unit 4d. The open and close unit 61 (the third open and close unit 61b) of the second switching unit 4b has one end connected to the cathode side terminal of the string 2 and the other end connected to the cathode side terminal of the inverter 3 and is driven to open and close by the first driving unit 4d. The open and close unit 61 (the fifth open and close unit 61c) of the third switching unit 5a has one end connected to the anode side terminal of the first group 6A and the other end connected to the first shutoff device 4, and is driven to open and close by the second driving unit 5f. The open and close unit 61 (the seventh open and close unit 61d) of the fourth switching unit 5b has one end connected to the cathode side terminal of the first group 6A and the other end connected to the anode side terminal of the second group 6B, and is driven to open and close by the second driving unit 5f.

The semiconductor switching device 63 is connected in parallel with the open and close unit 61, and turns an electric path other than the open and close unit 61 conductive or insulated. The semiconductor switching device 63 is, for example, a MOSFET device or an Insulated Gate Bipolar Transistor (IGBT) device.

The semiconductor switching device 63 (a first semiconductor switching device 63a) of the first switching unit 4a has a gate electrode, and the semiconductor switching device 63 (a second semiconductor switching device 63b) of the second switching unit 4b has a gate electrode, and these gate electrodes are connected to the first driving unit 4d. The first driving unit 4d is configured to output a predetermined voltage signal to these gate terminals so as to turn the first semiconductor switching device 63a and the second semiconductor switching device 63b into an ON state or an OFF state. Here, the "ON state" means that the semiconductor switching device 63 becomes conductive, and the "OFF state" means that the semiconductor switching device 63 becomes insulated.

The semiconductor switching device 63 (a third semiconductor switching device 63c) of the third switching unit 5a has a gate electrode, and the semiconductor switching device 63 (a fourth semiconductor switching device 63d) of the fourth switching unit 5b has a gate electrode. These gate electrodes are connected to the second driving unit 5f. The second driving unit 5f is configured to output a predetermined voltage signal to these gate terminals so as to turn the third semiconductor switching device 63c and the fourth semiconductor switching device 63d into an ON state or an OFF state.

When a voltage signal is output to the gate terminals to turn ON or OFF the semiconductor switching device 63 such as a MOSFET device or an IGBT device, almost no current flows through the gate terminals. Using such a MOSFET device, an IGBT device, or the like as the semiconductor switching device 63 leads to reduction of the power required to turn ON or OFF the semiconductor switching device 63.

In the third switching unit 5a and the fourth switching unit 5b, when the amount of power generated by the solar cell module groups for driving these switching units is smaller than the power required for driving the open and close unit 61 and/or the amount of power generated is unstable, the open and close unit 61 often opens and closes according to the amount of the power generated. Specifically, when the amount of power generated by the solar cell module groups is smaller than the power required for driving the open and close unit 61, even if an attempt is made to close the open and close unit 61, the closed open and close unit 61 may become open due to lack of the drive power. This action may be repeated, leading to a phenomenon in which opening or closing of the open and close unit 61 are repeated. Also, when the amount of power generated by the solar cell module groups for driving the switching units is unstable, the open and close unit 61 may become open and closed repeatedly. These phenomena destabilize the operation of the solar power generation system 1.

As such, in the third switching unit 5a and the fourth switching unit 5b, when the amount of power generated by the solar cell module groups for driving these switching units is smaller than the power required for driving the open and close unit 61 and/or the amount of power generated by the solar cell module groups is unstable, the semiconductor switching device 63 is turned ON before the open and close unit 61 is operated. That is, an electric path other than the open and close unit 61 is made conductive before the open and close unit 61 is operated to open and close. Specifically, when the open and close unit 61 is changed from the open state to the closed state in order to turn ON the switching unit, the semiconductor switching device 63 is turned ON while the open and close unit 61 remains open, and then the open and close unit 61 is switched from the open state to the closed state.

After the open and close unit 61 has entered the closed state, the semiconductor switching device 63 may remain in the ON state or be switched to the OFF state. This is because, with the open and close unit 61 in the closed state, the switching unit can be turned ON regardless of the state of the semiconductor switching device 63. Whether to keep the semiconductor switching device 63 in the ON state or to switch it to the OFF state can be appropriately determined depending on the usage or the like.

When the open and close unit 61 is switched from the closed state to the open state in order to turn the switching unit OFF, the semiconductor switching device 63 is turned ON while the open and close unit 61 remains closed, and then the open and close unit 61 is switched from the closed state to the open state. After the open and close unit 61 has entered the opened state, the semiconductor switching device 63 is switched from the ON state to the OFF state.

Even when the amount of power generated by the solar cell module groups for driving the switching units is stable and sufficiently large, in order to operate the open and close unit 61, the semiconductor switching device 63 is turned ON before the open and close unit 61 is operated.

In addition, in the first switching unit 4a and the second switching unit 4b which are not driven by the power from the solar cell modules 6, in order to operate the open and close unit 61, the semiconductor switching device 63 is turned ON before the open and close unit 61 is operated.

The semiconductor switching device 63 such as a MOSFET device or an IGBT device has a characteristic that it hardly generates a noise at its switching between an ON state and an OFF state. Also, the open and close unit 61 such as a relay does not generate a large noise unless a large voltage is applied across the open and close unit 61 in its opening and closing operation. Accordingly, turning ON the semiconductor switching device 63 before the open and close unit 61 is caused to operate precludes a large voltage from being applied across the open and close unit 61, and thereby the open and close unit 61 is unlikely to generate noise in its opening and closing. As a result, noise to be generated is reduced in the switching unit, and the operation of the solar power generation system 1 is stabilized.

Also, since no large noise is generated in the open and close unit 61, the open and close unit 61 is not required to have a large voltage resistance, resulting in cost reduction of the open and close unit 61.

Figure 6:
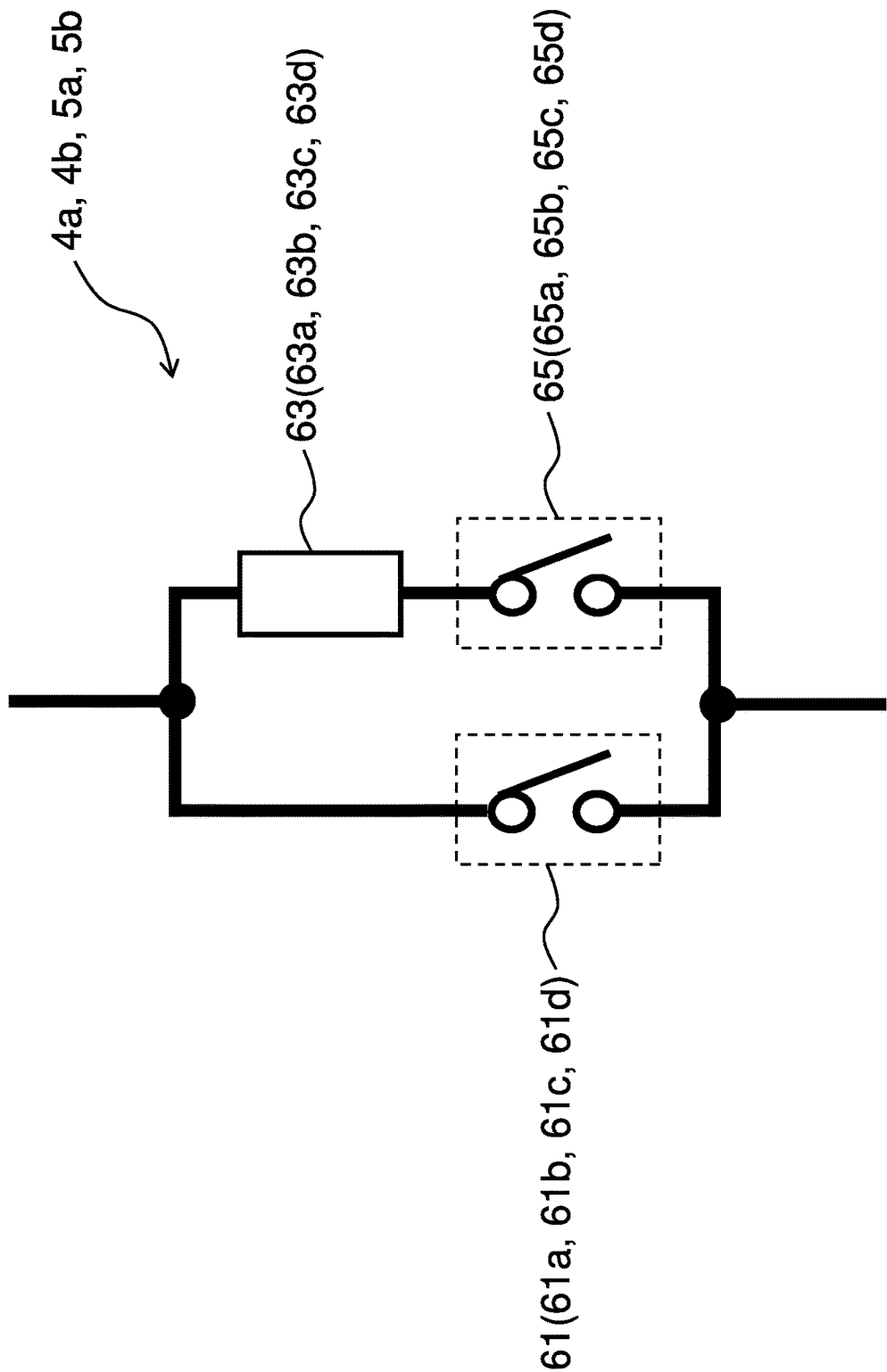
FIG. 6 is a diagram showing another configuration of a switching unit.

As another configuration of the switching unit, another open and close unit 65 may be connected in series with the semiconductor switching device 63, as shown in FIG. 6. The semiconductor switching device 63 is merely electrically insulated by using alternate arrangement of P-type semiconductor regions and N-type semiconductor regions in a semiconductor material. That is, the semiconductor switching device 63 does not provide complete insulation. In contrast, the open and close unit completely cuts off the electric path when the two contacts are separated from each other for cutoff. Thus, by connecting the open and close unit 65 to the semiconductor switching device 63 in series, the semiconductor switching device 63 can be electrically cut off from the solar power generation system 1 reliably. It should be noted that the another open and close unit 65 for the first switching unit 4a is the second open and close unit 65a The another open and close unit 65 for the second switching unit 4b is the fourth open and close unit 65b. The another open and close unit 65 for the third switching unit 5a is the second open and close unit 65c. The another open and close unit 65 for the fourth switching unit 5b is the eighth open and close unit 65d. FIG. 6 is a diagram showing an example of another switching unit.

Figure 7:
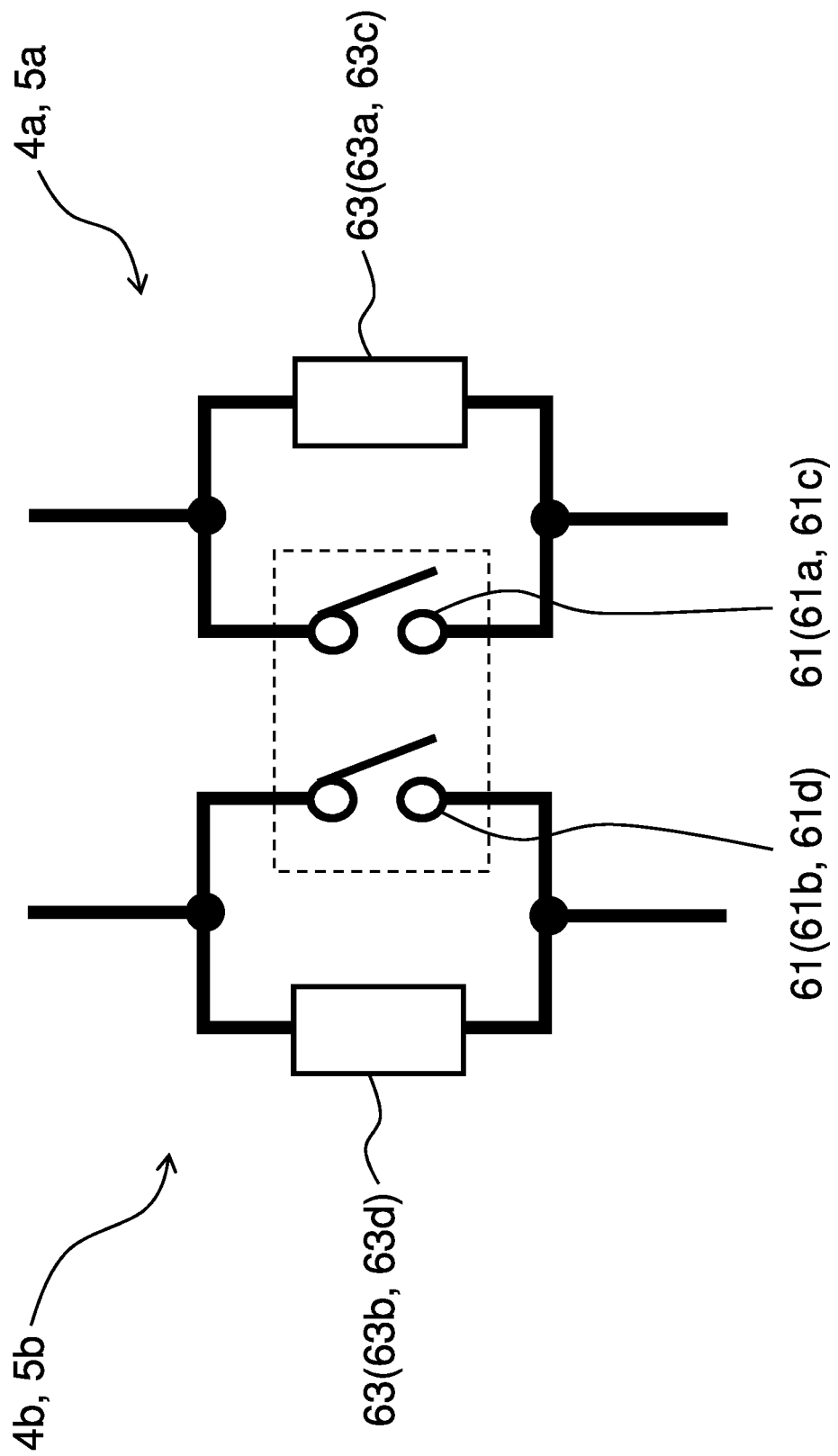
FIG. 7 is a diagram showing another configuration of a switching unit.

As another example of the configuration of the switching unit, as shown in FIG. 7, when a switching device (two-pole switching device) including a plurality of open and close units 61 is used in the switching unit, the semiconductor switching device 63 is arranged in each open and close unit 61. In this case, before the open and close unit 61 is operated, the semiconductor switching device 63, which is connected in parallel with the open and close unit 61 to be operated for opening and closing, is turned ON. FIG. 7 is a diagram showing another configuration of a switching unit.

Next, an example of operations of the first shutoff devices 4 and the second shutoff devices 5A to 5D will be described with reference to FIGS. 8 and 9. FIG. 8 shows the state of the first shutoff devices 4 in each operation mode. FIG. 9 shows the states of the second shutoff devices 5A to 5D in each operation mode. The operation modes of the solar power generation system 1 include three operating modes: a start mode, an active mode, and a safety mode. The safety mode includes a normal shutoff mode and an emergency safety shutoff mode. The operation of each mode will be described below by example of a case where the first switching unit 4a to the fourth switching unit 5b have the configuration shown in FIG. 5.

The start mode is a mode that turns effective when sunlight starts to hit the solar cell modules 6. At this time, the solar cell modules 6 receive sunlight to generate power. In the start mode, the inverter 3 outputs no first control signal S1 (the first control signal "NONE"), and thereby the first driving unit 4d outputs a drive signal to the first switching unit 4a and the second switching unit 4b in the first shutoff device 4. As a result, the first semiconductor switching device 63a and the second semiconductor switching device 63b are turned ON and then the first open and close unit 61a and the third open and close unit 61b are closed (the relay operation mode "ON"), which connects the string 2 to the inverter 3. Since no first control signal S1 is output, the first signal sending unit 4e outputs no second control signal S2.

In the second shutoff devices 5A to 5D, the power supply unit 5e uses the power generated in the solar cell module groups to generate power to drive the second shutoff devices 5A to 5D. Also, since the first shutoff device 4 outputs no second control signal S2 (the second control signal "NONE"), the second driving unit 5f uses the power generated by the power supply unit 5e to generate a drive signal and outputs it to the third switching unit 5a and the fourth switching unit 5b. As a result, the third semiconductor switching device 63c and the fourth semiconductor switching device 63d are turned ON and then the fifth open and close unit 61c and the seventh open and close unit 61d are closed (the relay operation mode "ON"), which connects the solar cell module group connected to the second shutoff devices 5A to 5D and another device.

In the start mode in which sunlight begins to hit the solar cell modules 6, the amount of power generated from the solar cell module groups is small. Thus, in the start mode, the fifth open and close unit 61c and the seventh open and close unit 61d, which are driven by the power generated by the solar cell module groups, often repeatedly open and close, destabilizing the operation of the solar power generation system 1.

For this reason, in the start mode, first, the third semiconductor switching device 63c and the fourth semiconductor switching device 63d are turned ON when the amount of power generated by the solar cell module groups is small. At this time, the fifth open and close unit 61c and the seventh open and close unit 61d are in the open state. After that, when the amount of power generated by the solar cell module groups becomes larger than the power required for driving the fifth open and close unit 61c and the seventh open and close unit 61d, these open and close units are closed. With the configuration, in the start mode in which the amount of power generated by the solar cell module groups is smaller than the power for driving the open and close units, the fifth open and close unit 61c and the seventh open and close unit 61d remain in the open state, and thereby it is possible to reduce the occurrence of the phenomenon in which the open and close units repeatedly open and close. As a result, the operation of the solar power generation system 1 in the start mode is stabilized. In addition, the third switching unit 5a and the fourth switching unit 5b can be turned ON by an electric path (that is, the third semiconductor switching device 63c and the fourth semiconductor switching device 63d) other than the fifth open and close unit 61c and the seventh open and close unit 61d. Thus, an electric path connecting the string 2 and the inverter 3 is secured in the start mode.

As described above, the power generated in the string 2 is supplied to the inverter 3 via the first shutoff device 4 in the start mode. The DC power supplied from the string 2 is converted into AC power by the inverter 3 and supplied to the power system 7.

The active mode is a state in which the solar cell modules 6 receive sunlight during the day to generate power, and is substantially the same as the start mode. Specifically, in the active mode, no first control signal S1 is output (the first control signal "NONE"), and the first switching unit 4*a* and the second switching unit 4*b* of the first shutoff device 4 are in the ON state (the relay operation mode "ON"). In addition, no second control signal S2 is output (the second control signal "NONE"), and the third switching unit 5*a* and the fourth switching unit 5*b* of the second shutoff devices 5A to 5D are in the ON state (the relay operation mode "ON"). As a result, the power generated in the string 2 is supplied to the inverter 3 via the first shutoff device 4. The DC power supplied from the string 2 is converted into AC power by the inverter 3 and supplied to the power system 7.

In the active mode, when the amount of power generated by the solar cell module groups decreases (for example, when the solar cell module is shaded), the third semiconductor switching device 63*c* and the fourth semiconductor switching device 63*d* are turned ON, and the fifth open and close unit 61*c* and the seventh open and close unit 61*d* are opened. After that, when the amount of power generated by the solar cell module groups becomes larger than the power required for driving the open and close unit 61, the fifth open and close unit 61*c* and the seventh open and close unit 61*d* are switched from the open state to the closed state. As such, in the active mode, it is possible to reduce the occurrence of the phenomenon in which, when the amount of power generated by the solar cell module groups becomes small, the fifth open and close unit 61*c* and the seventh open and close unit 61*d* are switched from the closed state to the open state, and the open and close unit 61 repeatedly opens and closes. In addition, since the third switching unit 5*a* and the fourth switching unit 5*b* can be turned ON by the electric paths (that is, the third semiconductor switching device 63*c* and the fourth semiconductor switching device 63*d*) other than the opened fifth open and close unit 61*c* and seventh open and close unit 61*d*, and thereby even if the amount of power generated by the solar cell module groups decreases, in the active mode, the power generated in the string 2 can be supplied to the inverter 3.

The normal shutoff mode is a mode when the solar cell modules 6 are not exposed to sunlight at night or due to the influence of bad weather such as rain. Accordingly, in the normal shutoff mode, the solar cell modules 6 do not generate power. In the normal shutoff mode, the inverter 3 outputs the first control signal S1 from the inverter 3 (the first control signal "PRESENT"). Thus, the first driving unit 4*d* remains the first semiconductor switching device 63*a* and the second semiconductor switching device 63*b* in the ON state, and opens the first open and close unit 61*a* and the third open and close unit 61*b*, and then turns OFF the first semiconductor switching device 63*a* and the second semiconductor switching device 63*b* (the relay operation mode "OFF"). As a result, the string 2 and the inverter 3 are cut off.

In the second shutoff devices 5A to 5D, due to the output of the first control signal S1, the first signal sending unit 4*e* outputs the second control signal S2 to the string 2 by power line communication (the second control signal is "PRESENT"). In response to the second control signal S2, the second driving unit 5*f* turns OFF the third semiconductor switching device 63*c* and the fourth semiconductor switching device 63*d*. In addition, since no power is generated from the solar cell module group in the normal cutoff mode, the fifth open and close unit 61*c* and the seventh open and close unit 61*d* are in the open state (the relay operation mode "OFF").

In the normal shutoff mode, since the second control signal is output, the second driving unit 5*f* remains the third semiconductor switching device 63*c* and the fourth semiconductor switching device 63*d* in the OFF state.

In the normal shutoff mode, when the power generation by the solar cell modules is unstable due to unstable weather or the like, the fifth open and close unit 61*c* and the seventh open and close unit 61*d* repeatedly opens and closes and the operation of the solar power generation system 1 becomes unstable. Thus, when the amount of power generated by the solar cell module groups becomes unstable due to unstable weather or the like, the third semiconductor switching device 63*c* and the fourth semiconductor switching device 63*d* are turned ON, and the fifth open and close unit 61*c* and the seventh open and close unit 61*d* are opened. After that, when the amount of power generated by the solar cell module group becomes larger than the power required for driving the fifth open and close unit 61*c* and the seventh open and close unit 61*d* and stabilizes, the fifth open and close unit 61*c* and the seventh open and close unit 61*d* are switched from the open state to the closed state. As such, when the amount of power generated by the solar cell module groups is unstable, the fifth open and close unit 61*c* and the seventh open and close unit 61*d* are kept in the open state, and thereby it is possible to reduce the occurrence of the phenomenon that the fifth open and close unit 61*c* and the seventh open and close unit 61*d* repeatedly open and close. As a result, the operation of the solar power generation system 1 is stabilized.

The emergency safety shutoff mode is a mode in which the power supply from the string 2 to the inverter 3 is cut off during the start mode or the active mode. The emergency safety shutoff mode starts when the operation switch 8 is operated in the start mode or the active mode.

Specifically, with an operation of the operation switch 8, the first control signal generating unit 3*d* of the inverter 3 sends the first control signal S1 to the first shutoff device 4 by power line communication (the first control signal "PRESENT").

When the first signal receiving unit 4*c* receives the first control signal S1, the first driving unit 4*d* stops outputting drive power to the first switching unit 4*a* and the second switching unit 4*b*. As a result, the first switching unit 4*a* and the second switching unit 4*b* are turned OFF, and the string 2 and the inverter 3 are cut off (the relay operation mode "OFF"). At the timing when the first switching unit 4*a* and the second switching unit 4*b* are turned OFF, the first signal sending unit 4*e* outputs the second control signal S2 to the string 2 by power line communication (the second control signal is "PRESENT").

When the second signal receiving unit 5*c* of the second shutoff devices 5A to 5D receives the second control signal S2, the second driving unit 5*f* stops outputting driving power to the third switching unit 5*a* and the fourth switching unit 5*b*. As a result, the third switching unit 5*a* and the fourth switching unit 5*b* are turned OFF, and the solar cell module groups connected to the second shutoff devices 5A to 5B and the other device are cut off (the relay operation mode "OFF"). That is, the voltages output from all the solar cell modules 6 included in the string 2 are cut off.

As described above, in the emergency safety shutoff mode, the first shutoff device 4 is able to shutoff the string 2 and the inverter 3, and the second shutoff devices 5A to 5D are able to cut off the solar cell module groups in the string 2 by group. Specifically, the second shutoff device 5A cuts off the connection between the first group 6A and the second group 6B. The second shutoff device 5B cuts off the connection between the second group 6B and the third group 6C and the connection between the third group 6C and the fourth group 6D. The second shutoff device 5C cuts off the connection between the fourth group 6D and the fifth group 6E and the connection between the fifth group 6E and the sixth group 6F. The second shutoff device 5D cuts off the connection between the sixth group 6F and the seventh group 6G and the connection between the seventh group 6G and the eighth group 6H.

With the configuration, in the solar power generation system 1, the installation cost of the shutoff devices can be reduced compared with the case where a shutoff device is installed for each solar cell module 6. In addition, in the emergency safety shutoff mode, not only the string 2 is cut off for each solar cell module group, but also the connection between the string 2 and the inverter 3 is cut off, and thereby a solar power generation system with higher safety can be provided.

In the above solar power generation system, the switching unit includes the open and close unit 61 and the semiconductor switching device 63 connected in parallel with the open and close unit 61. In addition, the semiconductor switching device 63 is turned ON before the open and close unit 61 is operated. In the switching units (that is, the third switching unit 5a and the fourth switching unit 5b) that are driven by the power from the solar cell module groups, the turning ON of the semiconductor switching device 63 before the opening or closing operation of the open and close unit 61 reduces the occurrence of the phenomenon in which, when the amount of power generated by the solar cell module groups is small and/or when the amount of power is unstable, the open and close unit 61 opens and closes according to the amount of the power, and the open and close unit 61 repeatedly opens and closes. As a result, the operation of the solar power generation system 1 is stabilized.

Since a large voltage is not applied across the open and close unit 61, the open and close unit 61 is less likely to generate noise and chattering during the opening and closing operations. In addition, the semiconductor switching device 63 has a characteristic that it hardly generates noise and chattering during the switching operation between the ON state and the OFF state. As a result, generation of noise and chattering is reduced in the switching unit, and the operation of the solar power generation system 1 is stabilized.

One embodiment of the present invention has been described above, but the present invention is not limited to the above embodiment, and various modifications can be made without departing from the gist of the invention.

The group division of solar cell module groups in string 2 and the number of solar cell modules 6 included in each group can be determined as needed, for example, based on the open-circuit voltage to be used for cutting off the string 2 during the emergency safety shutoff mode. For example, in the emergency safety shutoff mode, the open circuit voltage of string 2 is preferably divided to 165 V or less. When one solar cell module 6 has an open-circuit voltage of 50 V, it is preferable to cut off the strings 2 into groups each including three solar cell modules 6.

Figure 10:
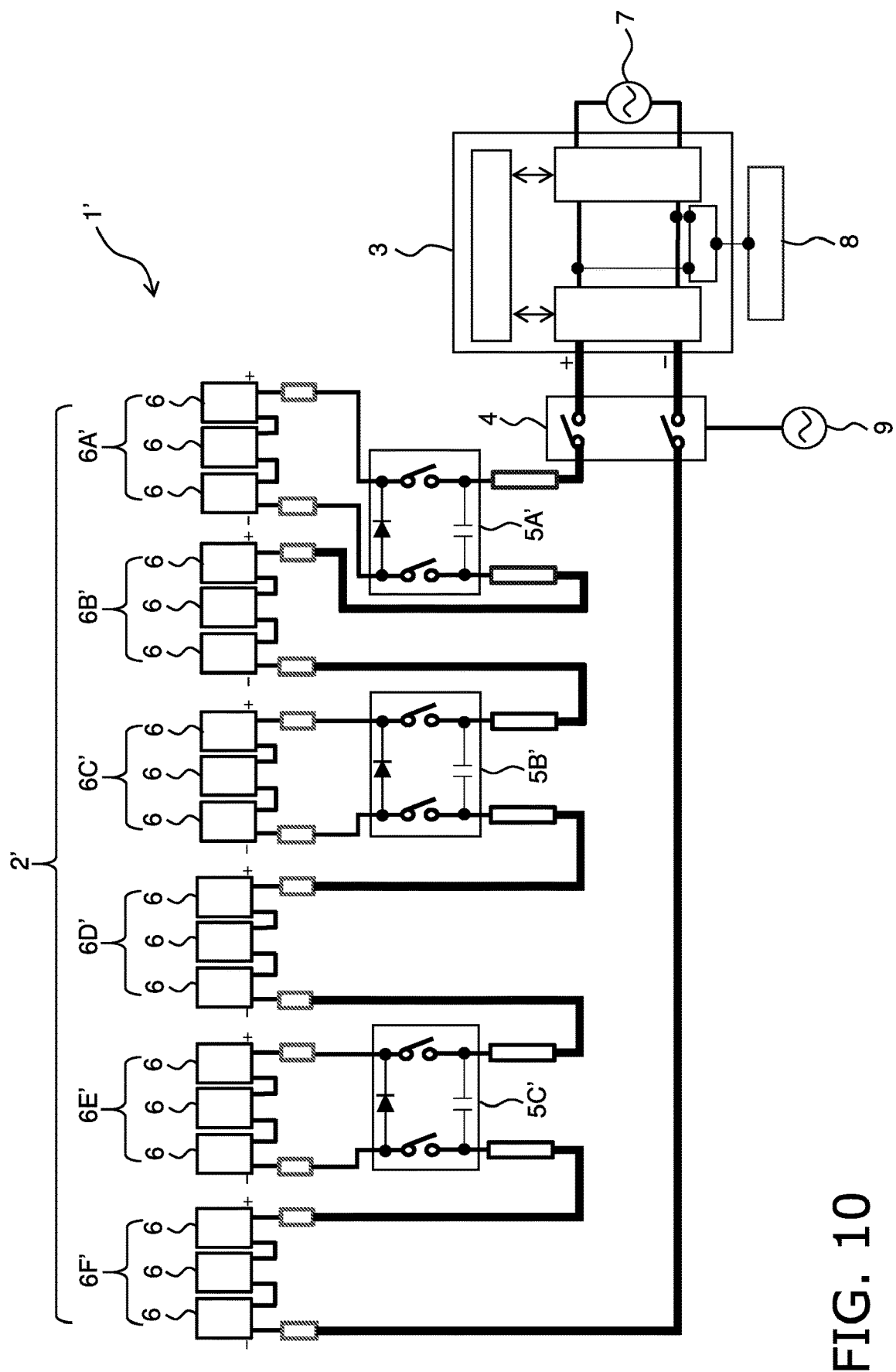
FIG. 10 is a diagram showing another configuration of solar cell module groups in a string.

For example, in the solar power generation system 1' shown in FIG. 10, the string 2' includes 18 solar cell modules 6 connected in series, and includes six solar cell module groups 6A' to 6F'. Each of the solar cell module groups 6A' to 6F' includes three serial solar cell modules 6. Further, the solar cell module groups 6A', 6C', 6E' are connected to second shutoff devices 5A', 5B', 5C', respectively. FIG. 10 is a diagram showing another configuration of solar cell module groups in a string.

Figure 11:
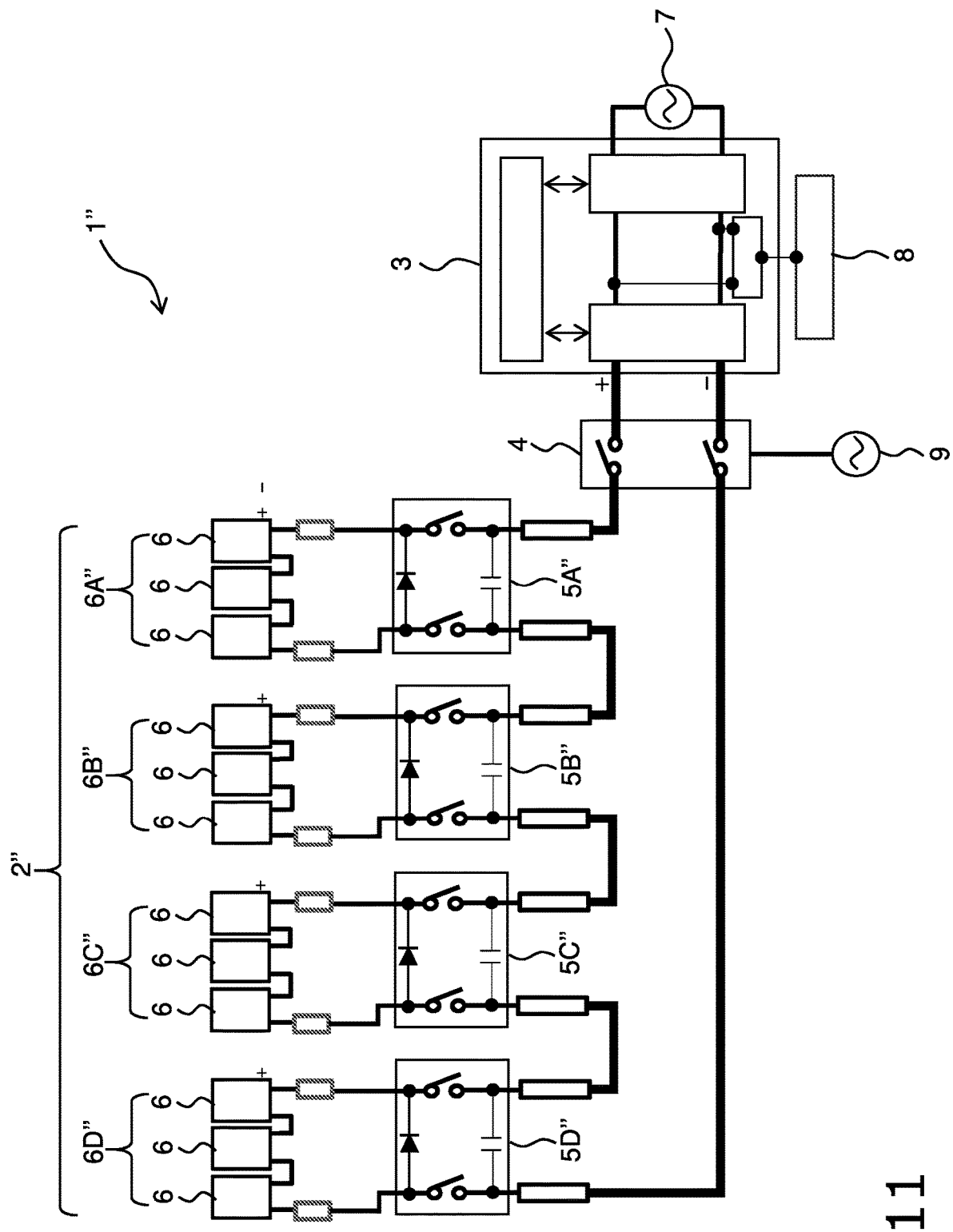
FIG. 11 is a diagram showing another configuration of solar cell module groups in a string.

In the solar power generation system 1" shown in FIG. 11, for example, the string 2" includes 12 solar cell modules 6 connected in series, and includes four solar cell module groups 6A" to 6D". Each of the solar cell module group 6A" to 6D" includes three serial solar cell modules 6. Furthermore, the solar cell module groups 6A" to 6D" are connected to second shutoff devices 5A" to 5D", respectively. FIG. 11 is a diagram showing another configuration of solar cell module groups in a string.

It should be noted that the solar power generation systems 1' and 1" differ from the above solar power generation system 1 only in the configuration of the solar cell module groups in the strings 2' and 2". Other configurations of the solar power generation systems 1' and 1" are the same as those of the solar power generation system 1.

The start mode or the active mode may be switched to the emergency safety shutoff mode when an abnormality is detected in the output from the solar cell modules 6 in the string 2. In this case, for example, the solar power generation system 1 may include a sensor configured to detect an output of the solar cell module 6, so that when an abnormality is detected from the output of the solar cell module 6 by the sensor, the first control signal generating unit 3d of the inverter 3 outputs the first control signal S1 to perform the switching to the emergency safety shutoff mode. Alternatively, for example, the inverter 3 may be connected to a fire sensor or a fire alarm, so that when the inverter 3 receives a signal from the fire sensor or the fire alarm, the first control signal generating unit 3d outputs the first control signal S1 to perform the switching to the emergency safety shutoff mode.

The first control signal S1 and/or the second control signal S2 can be sent and received by methods other than power line communication. For example, the first control signal S1 and/or the second control signal S2 may be sent and received by wireless communication. Alternatively, the first control signal S1 may be sent and received by power line communication, while the second control signal S2 may be sent and received by wireless communication. For sending and receiving the second control signal S2 by wireless communication, no bypass circuit 5d is necessary in the second shutoff device.

The first control signal S1 and/or the second control signal S2 may represent different types of information. That is, switching to the emergency safety shutdown mode can be determined not only by the presence or absence of the first control signal S1 and the second control signal S2, but also by a certain type of information represented by the first control signal S1 and/or the second control signal S2.

For example, the first control signal S1 and the second control signal S2 may represent two types of values by binary numbers (referred to as a first value and a second value). In this case, for example, when the first control signal S1 and the second control signal S2 exhibit the first value, the switching to the emergency safety shutoff mode may be determined to be performed (the sting 2 and the inverter 3 are cut off, and/or the connections between the solar cell module groups in the string 2 are cut off). When the first control signal S1 and the second control signal S2 exhibit the second value, the switching may be determined not to be performed (the string 2 and inverter 3 are remained connected, and/or the solar cell module groups in the sting 2 are remained connected).

The first control signal S1 and the second control signal S2 may be output at any time in modes other than the emergency safety shutoff mode, and the output of the first control signal S1 and the second control signal S2 may be stopped in the emergency safety shutoff mode. In this case, the first shutoff device and the second shutoff device turn ON the switching units when receiving the first control signal S1 and the second control signal S2, and turn OFF the switching units when not receiving the first control signal S1 and the second control signal S2.

The present invention is widely applicable to solar power generation systems having a rapid shutdown function.

1, 1', 1" Solar power generation system
2, 2', 2" String
3 Inverter
3a DC/DC converter
3b DC/AC inverter
3c Control unit
3d First control signal generating unit
4 First shutoff device
4a First switching unit
4b Second switching unit
4c First signal receiving unit
4d First driving unit
4e First signal sending unit
5A to 5D Second shutoff device
5A' to 5C' Second shutoff device
5A" to 5D" Second shutoff device
5a Third switching unit
5b Fourth switching unit
5c Second signal receiving unit
5s Bypass circuit
5e Power supply unit
5f Second driving unit
5g Bypass device
6 Solar cell modules
6A to 6H Solar cell module group
6A' to 6F' Solar cell module group
6A" to 6D" Solar cell module group
7 Power system
8 Operation switch
9 Commercial power supply
61 open and close unit
63 Semiconductor switching device
65 Another open and close unit
S1 First control signal
S2 Second control signal

The invention claimed is:

1. A solar power generation system comprising:
a string including a plurality of solar cell modules connected in series;
an inverter connected to the string and configured to convert DC power output from the string to AC power;
a first shutoff device connected between the string and the inverter, the first shutoff device configured to cut off the string and the inverter in response to a first control signal from the inverter; and
a second shutoff device connected to an electric path connecting a solar cell module group and either another solar cell module or the inverter, the solar cell module group including one or more among the plurality of solar cell modules connected in series in the string, the second shutoff device configured to cut off the solar cell module group and either the another solar cell module or the inverter in response to a second control signal from the first shutoff device, wherein the second shutoff device is driven by power generated by the one or more among the plurality of solar cell modules connected in series in the solar cell module group,
the second shutoff device includes a first switching unit connected to an electric path connecting an anode side terminal of the solar cell module group and either the another solar cell module or the inverter,
the first switching unit includes a first open and close unit and a first semiconductor switching device connected in parallel with the first open and close unit,
the first semiconductor switching device is turned ON before the first open and close unit is operated,
the first shutoff device includes a third switching unit connected to an anode side terminal of the string and an anode side terminal of the inverter,
the third switching unit includes a fifth open and close unit and a third semiconductor switching device connected in parallel with the fifth open and close unit,
the third semiconductor switching device is turned ON before the fifth open and close unit is operated,
the first shutoff device includes a fourth switching unit connected to a cathode side terminal of the string and a cathode side terminal of the inverter,
the fourth switching unit includes a seventh open and close unit and a fourth semiconductor switching device connected in parallel with the seventh open and close unit,
the fourth semiconductor switching device is turned ON before the seventh open and close unit is operated, and
the third switching unit and the fourth switching unit are configured to be turned ON/OFF independently of each other.

2. The solar power generation system according to claim 1, wherein
the first switching unit includes a second open and close unit connected in series with the first semiconductor switching device.

3. The solar power generation system according to claim 1, wherein
the second shutoff device includes a second switching unit connected to an electric path connecting a cathode side terminal of the solar cell module group and either the another solar cell module or the inverter,
the second switching unit includes a third open and close unit and a second semiconductor switching device connected in parallel with the third open and close unit, and
the second semiconductor switching device is turned ON before the third open and close unit is operated.

4. The solar power generation system according to claim 3, wherein
the second switching unit includes a fourth open and close unit connected in series with the second semiconductor switching device.

5. The solar power generation system according to claim 3, wherein
the first switching unit and the second switching unit are configured to be turned ON/OFF simultaneously.

6. The solar power generation system according to claim 3, wherein
the first switching unit and the second switching unit are configured to be turned ON/OFF independently of each other.

7. The solar power generation system according to claim 1, wherein the third switching unit includes a sixth open and close unit connected in series with the third semiconductor switching device.

8. A solar power generation system comprising:
a string including a plurality of solar cell modules connected in series;
an inverter connected to the string and configured to convert DC power output from the string to AC power;
a first shutoff device connected between the string and the inverter, the first shutoff device configured to cut off the string and the inverter in response to a first control signal from the inverter; and
a second shutoff device connected to an electric path connecting a solar cell module group and either another solar cell module or the inverter, the solar cell module group including one or more among the plurality of solar cell modules connected in series in the string, the second shutoff device configured to cut off the solar cell module group and either the another solar cell module or the inverter in response to a second control signal from the first shutoff device,
wherein
the second shutoff device is driven by power generated by the one or more among the plurality of solar cell modules connected in series in the solar cell module group,
the second shutoff device includes a first switching unit connected to an electric path connecting an anode side terminal of the solar cell module group and either the another solar cell module or the inverter,
the first switching unit includes a first open and close unit and a first semiconductor switching device connected in parallel with the first open and close unit,
the first semiconductor switching device is turned ON before the first open and close unit is operated,
the first shutoff device includes a third switching unit connected to an anode side terminal of the string and an anode side terminal of the inverter,
the third switching unit includes a fifth open and close unit and a third semiconductor switching device connected in parallel with the fifth open and close unit,
the third semiconductor switching device is turned ON state before the fifth open and close unit is operated,
the first shutoff device includes a fourth switching unit connected to a cathode side terminal of the string and a cathode side terminal of the inverter,
the fourth switching unit includes a seventh open and close unit and a fourth semiconductor switching device connected in parallel with the seventh open and close unit,
the fourth semiconductor switching device is turned ON before the seventh open and close unit is operated, and
the fourth switching unit includes an eighth open and close unit connected in series with the fourth semiconductor switching device.

9. The solar power generation system according to claim 1, wherein
the second shutoff device includes a bypass device connected in parallel with the solar cell module group and configured to form an electric path bypassing the solar cell module group.

10. The solar power generation system according to claim 1, wherein
the first shutoff device is driven by power supplied from a commercial power supply.

11. The solar power generation system according to claim 1, wherein
the inverter outputs the first control signal to the first shutoff device by power line communication.

12. The solar power generation system according to claim 1, wherein
the inverter outputs the first control signal to the first shutoff device by wireless communication.

13. The solar power generation system according to claim 1, wherein
the first shutoff device outputs the second control signal to the second shutoff device by power line communication, upon receipt of the first control signal from the inverter.

14. The solar power generation system according to claim 1, wherein
the first shutoff device outputs the second control signal to the second shutoff device by wireless communication, upon receipt of the first control signal from the inverter.

* * * * *